United States Patent

Stander

[11] 3,875,031
[45] Apr. 1, 1975

[54] EFFLUENT TREATMENT

[75] Inventor: Cornelius Marthinus Stander, Kempton Park, South Africa

[73] Assignee: AE & CI Limited, Johannesburg, South Africa

[22] Filed: June 7, 1973

[21] Appl. No.: 368,046

[30] Foreign Application Priority Data
June 26, 1972 South Africa.................. 72/4407

[52] U.S. Cl.............. 204/98, 204/99, 204/128, 204/153
[51] Int. Cl. ........ C01d 1/06, C01b 7/00, C01d 1/40
[58] Field of Search ............. 204/98, 99, 128, 153; 423/179, 181, 184, 196, 197

[56] References Cited
UNITED STATES PATENTS
| | | |
|---|---|---|
| 2,044,888 | 6/1936 | Overdick et al. .................. 204/153 |
| 2,142,670 | 1/1939 | Eichelberger...................... 204/153 |
| 2,270,376 | 1/1942 | Ladd................................... 204/153 |
| 2,404,453 | 7/1946 | Osborne et al. ................... 204/153 |

*Primary Examiner*—G. L. Kaplan
*Assistant Examiner*—Aaron Weisstuch
*Attorney, Agent, or Firm*—Cushman, Darby & Cushman

[57] ABSTRACT

A method of treating aqueous effluent containing caustic soda and oxychlorine compounds comprising filling the anode and cathode compartments of an electrolytic diaphragm cell with effluent to provide an electrolyte, electrolysing the effluent and reducing the oxychlorine compounds to chloride ions and hydroxyl ions at the cathode, recovering chlorine from the anode compartment and sodium hydroxide solution from the cathode compartment while allowing the effluent to flow through the cell by introducing effluent into the cathode compartment.

7 Claims, 2 Drawing Figures

EFFLUENT TREATMENT

This invention relates to the treatment in electrolysis cells of effluents containing caustic soda and oxychlorine compounds.

Aqueous effluents containing caustic soda and oxychlorine compounds such as chlorites, hypochlorites and chlorates are produced in many industrial processes. One example of such processes is the manufacture of chlorocarbons.

These effluents also contain considerable quantities of chloride.

The chlorine and caustic soda contained in the effluents are products which can be recycled into the process from which the compounds originate, if they can be recovered by economical methods.

Chlorine and caustic soda are normally prepared by electrolysing a brine solution in electrolysis cells.

Two types of cells are used: the flowing mercury cathode cell and the diaphragm cell.

In the mercury cell, chlorine is formed at the anode and sodium amalgam at the cathode. Caustic soda is then obtained by the decomposition of the sodium amalgam.

However, the mercury cathode cell will not be suitable for the recovery of caustic soda and chlorine from effluents containing oxychlorine compounds, since the hypochlorites and chlorites will be oxidised to chlorates and the effluent problem will not be solved.

In the diaphragm cell the caustic soda is formed in the cathode compartment of the cell and chlorine in the anode compartment. The cathode and anode compartments are separated by a diaphragm to avoid the formation of hypochlorite and chlorate in the anode compartment by the reaction between chlorine and hydroxyl ions. Hydrogen is also formed at the cathode and the diaphragm also serves to separate the hydrogen and chlorine formed in the cell. The brine is fed to the anode compartment to counteract the migration of the hydroxyl ions from the cathode compartment to the anode compartment.

To recover chlorine and caustic soda from the effluents referred to above, this method of electrolysis cannot be used since hypochlorite and chlorate are present therein and electrolysing the effluent in a diaphragm cell as used in brine electrolysis will favour the formation of chlorates and even perchlorates in the anode compartment.

It is an object of the present invention electrolytically to decompose effluent containing caustic soda and oxychlorine compounds and to recover caustic soda and chlorine from such effluent, which products, if desired, may be recycled to the process from which the effluent originates.

According to the present invention a method is provided of treating aqueous effluent containing caustic soda and oxychlorine compounds comprising filling the anode and cathode compartments of an electrolytic diaphragm cell with effluent to provide an electrolyte, electrolysing the effluent and reducing the oxychlorine compounds to chloride ions and hydroxyl ions at the cathode, recovering chlorine from the anode compartment and sodium hydroxide solution from the cathode compartment while allowing the effluent to flow through the cell by introducing effluent into the cathode compartment.

The anode compartment of the cell may be filled with an acidified brine solution instead of effluent, to avoid the formation of oxygen at the anode in the initial stage of the electrolysis caused by the presence of hydroxyl ions in the anode compartment.

Preferably, the effluent in the anode compartment is acidified with hydrochloric acid before the start of the electrolysis to decrease the hydroxyl ion concentration and thus avoid the initial formation of oxygen at the anode.

The oxychlorine compounds are preferably reduced at a cathode made of iron or steel, although other suitable cathodes may be used.

The chlorine may be formed at a carbon or graphite anode but it is preferred to use anodes made of titanium coated with a metal selected from the following elements, platinum, palladium, ruthenium, rhodium and iridium.

The anode and cathode compartments may be separated by a diaphragm made of any material suitable for immersion in a corrosive liquid such as, for example, woven polyvinyl chloride cloth.

In practising the method of this invention, the chlorine containing ions present in the effluent will be reduced to chloride ions at the cathode before hydrogen formation takes place, since the oxidation potentials of these ions are higher than that of the hydrogen ions. The chloride ions will then migrate to the anode compartment where chlorine gas will be formed at the anode. Hydroxyl ions will also tend to migrate to the anode. However, the hydrogen ion concentration in the anode compartment is kept at a pH of about 4 in the anode compartment and the hydroxyl ion concentration will be negligible.

The chlorine is removed from the anode compartment and this causes a concentration gradient of chloride ions between the cathode and anode compartments. Therefore, the movement of the chloride ions to the anode compartment will be fast and substantially pure chlorine gas will be obtained from the anode compartment. Hydroxyl ions and sodium ions which are present in the effluent will not be reduced at the cathode and can be removed from the cathode compartment as sodium hydroxide solution. The effluent is fed continuously into the cathode compartment. Hydrogen formation at the cathode can be avoided but, to lower the chloride content of the effluent by electrolysing the sodium chloride present therein, hydrogen is normally formed at the cathode. Chlorine is obtained from the anode compartment and sodium hydroxide solution substantially free of oxychlorine compounds is obtained from the cathode compartment.

The invention will now be described with reference to the accompanying drawings, without restricting the scope of the invention to the particular embodiments shown therein.

Figure 1:
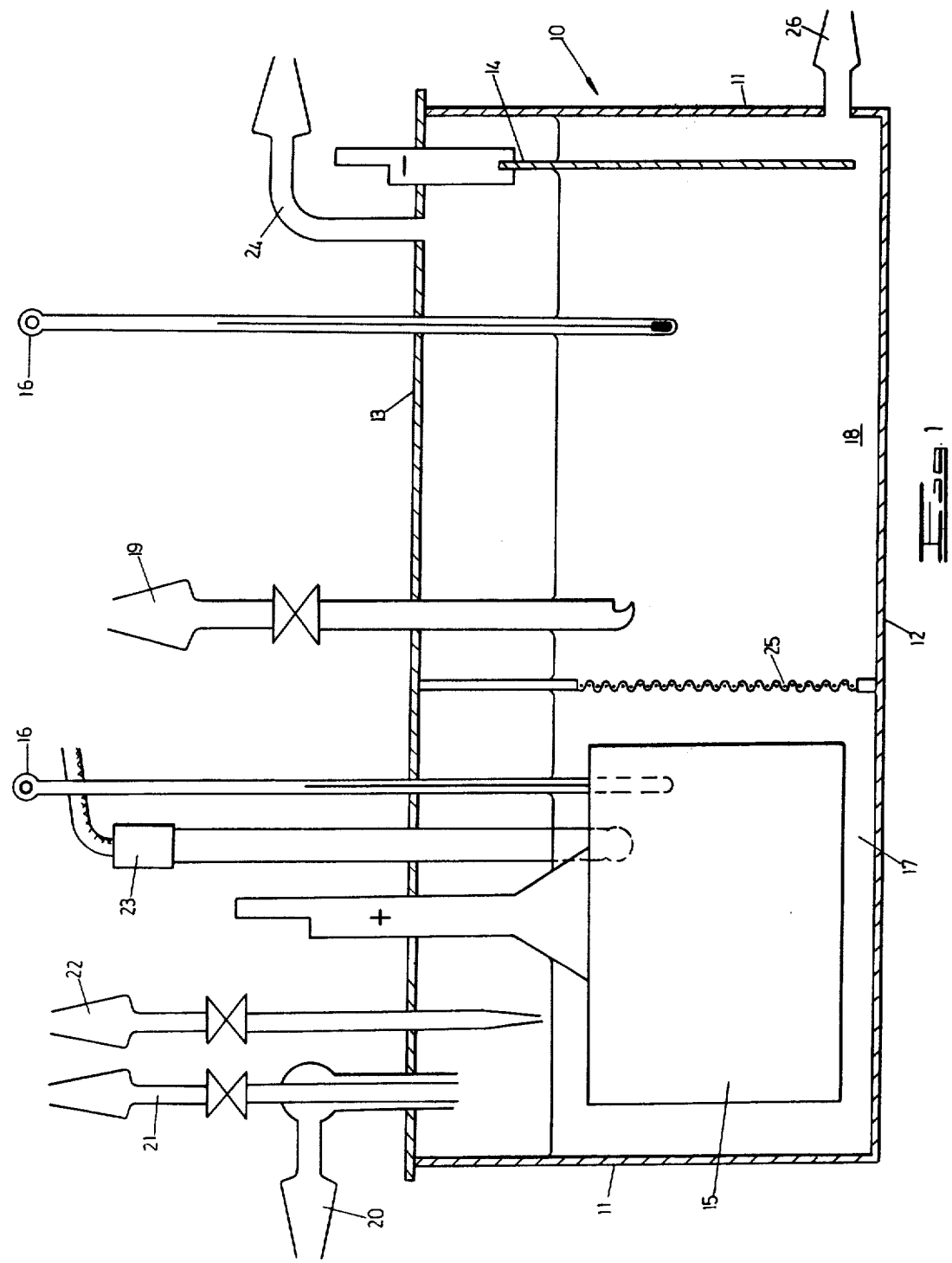
FIG. 1 is a diagrammatic representation of a laboratory type diaphragm cell which was made for use in the method of the present invention.

In FIG. 1, sides 11 and bottom 12 of the cell 10 were constructed of plate glass. The lid 13 was made of polytetrafluoroethylene wherein holes were provided for the connections to a mild steel cathode 14 and a graphite anode 15, thermometers 16 for measuring the temperatures in the anode and cathode compartments 17 and 18, an inlet 19 for the effluent, an outlet 20 for the chlorine combined with an inlet 21 to introduce brine, if required, into the anode compartment 17. Further holes were provided in lid 13 for inlet 22 to introduce acid into the anode compartment 17, a pH-probe 23 to measure the pH of the anolyte and an outlet 24 for hydrogen. In one side 11 of the cathode compartment 18, outlet 26 was provided to remove sodium hydroxide solution. The diaphragm 25 was a piece of woven polyvinyl chloride cloth mounted on a mild steel frame.

In an experiment using the cell as shown in FIG. 1, the anode compartment 17 was filled with a 5 percent by weight sodium chloride solution the pH of which was adjusted to pH4 with hydrochloric acid. An aqueous effluent containing sodium hydroxide, sodium hypochlorite and sodium chlorate was allowed to flow through the cathode compartment 18. The rate of flow and the current were so adjusted that hydrogen evolution just started at the cathode, indicating that all reducible oxychlorine ions had been reduced and that the reduction of water and the formation of hydroxyl ions was proceeding.

The experiment was run during two consecutive days, whereby samples were collected at the outlet 26 and were analysed iodometrically for hypochlorite and chlorate ions and acidimetrically for hydroxide. The results of the two runs are given below:

|  | % NaOH | % NaOCl % NaClO$_3$ |
|---|---|---|
| Inlet | 3.20 | 3.57 |
| Outlet 1st day | 6.27 | 0.00 |
| Outlet 2nd day | 6.23 | 0.02 |

The results show that a product free of oxychlorine ions wherein the hydroxide content is increased can be produced from the effluent, while chlorine is also produced.

The hydroxide solution and the chlorine are both suitable for re-use.

A further cell for use in the method of the invention was constructed out of dense concrete. The external dimensions of the cell were 160 mm wide, 440 mm long and 260 mm high.

Figure 2:
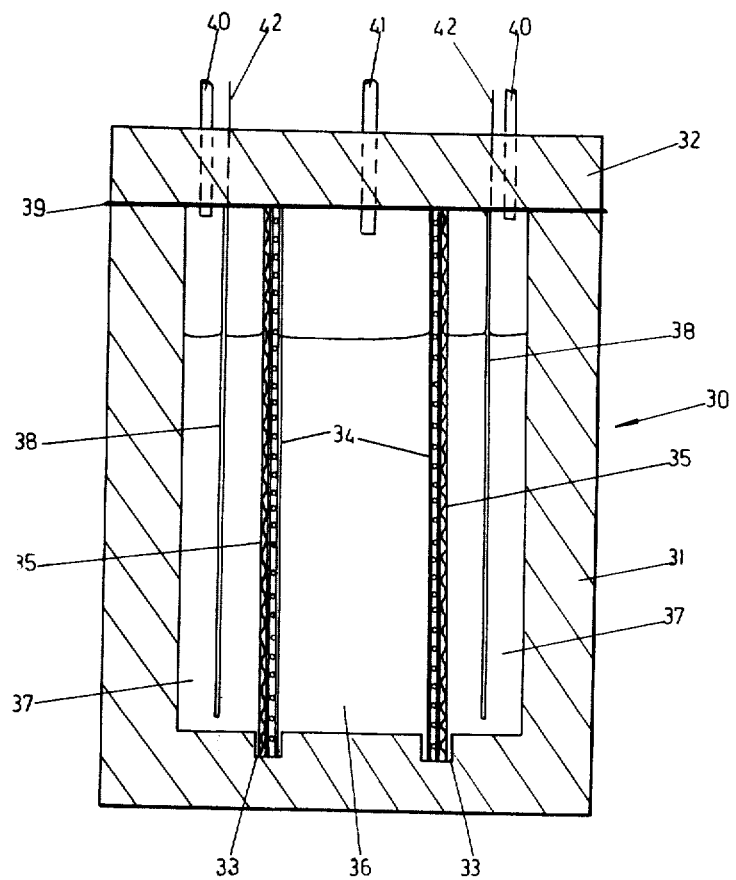
FIG. 2 is a section through a further embodiment of a cell according to the invention.

FIG. 2 illustrates the position of the electrodes in this cell.

The cell 30 consists of cell body 31 and lid 32 constructed of 30 mm thick concrete coated with coal tar pitch.

The end walls and the bottom of cell body 31 were provided with grooves 33 to accommodate two cathodes 34 covered on one side with a woven polyvinyl chloride diaphragm 35.

The cathodes 34 were made of mild steel screening, having a wire diameter of 2 mm and a spacing of 50 mm, welded into a mild steel frame.

The cathodes 34 were fixed in the grooves 33 of cell body 31 with coal tar pitch.

In this way, the cell 30 was divided into three compartments, one cathode compartment 36 and two anode compartments 37.

The anodes 38 were suspended from lid 32 and they were made of platinum coated titanium.

A seal 39 was provided between the lid 32 and cell body 31 as well as cathodes 34 to prevent leakage from cell 30 and mixing of the gases formed in the cathode and anode compartments.

The cell 30 was further provided with outlets 40 to remove chlorine from the anode compartments 37 and outlet 41 to remove hydrogen from the cathode compartment 36.

The lugs 42 on lid 32 were provided to connect the anodes to a source of electricity.

Other inlets and outlets (not shown) are provided in the end walls of cell body 31, such as inlets for effluent to the cathode compartment 36 and inlets for acid or anolyte to the anode compartments 37.

Cathode compartment 36 is further provided with an outlet (not shown) for the caustic formed in the cell. Connections (not shown) for the anodes 34 are also provided.

In an experiment using the cell 30 as illustrated in FIG. 2, an effluent having the following weight/volume composition was fed to cathode compartment 36.

| Sodium hypochlorite | 9.7% w/v |
|---|---|
| Sodium hydroxide | 3.0% w/v |
| Sodium chloride | 23.7% w/v |

The anode compartments 37 were filled with the same effluent neutralized to a pH 4 with hydrochloric acid.

The effluent was electrolyzed at a potential of 4.5 volt and a current of 75 ampere, which gave a current density of 360 A/m$^2$.

The rate of flow of the effluent was so adjusted that hydrogen evolution just started at the cathode, indicating that all reducible oxychlorine ions had been reduced.

Samples taken from the flow from the cathode compartment 36 had the following weight/volume composition:

| Sodium hypochlorite | 0.31% w/v |
|---|---|
| Sodium hydroxide | 7.80% w/v |
| Sodium chloride | 23.9% w/v |

Chlorine was evolved in the anode compartments. The results indicate that this type of cell is also suitable for use in the method of the invention. The hypochlorite was reduced efficiently and re-usable chlorine and caustic were produced.

The method of the invention provides an economically attractive method for the decomposition of aqueous effluents containing oxychlorine compounds whereby chlorine and caustic solution are produced suitable for re-use.

I claim:

1. A method of treating aqueous effluent containing caustic soda and oxychlorine compounds comprising filling the anode and cathode compartments of an electrolytic diaphragm cell with effluent to provide an electrolyte, electrolysing the effluent and reducing the oxychlorine compounds to chloride ions and hydroxyl ions at the cathode, recovering chlorine from the anode compartment and sodium hydroxide solution from the cathode compartment while allowing the effluent to flow through the cell by introducing effluent into the cathode compartment.

2. A method as claimed in claim 1 wherein the effluent in the anode compartment is acidified.

3. A method as claimed in claim 2 wherein the solution or effluent is acidified by the addition of hydrochloric acid.

4. A method as claimed in claim 1 wherein the oxychlorine compounds are reduced at an iron or steel cathode.

5. A method as claimed in claim 1 wherein chlorine is formed at a carbon or graphite anode.

6. A method as claimed in claim 1 wherein chlorine is formed at an anode made of titanium coated with a metal selected from the following elements, platinum, palladium, ruthenium, rhodium and iridium.

7. A method as claimed in claim 1 wherein the cathode and anode compartments are separated by a diaphragm made of woven polyvinyl chloride cloth.

* * * * *